US012632865B2

(12) United States Patent
Fyfe et al.

(10) Patent No.: US 12,632,865 B2
(45) Date of Patent: May 19, 2026

(54) CUSTOMER IDENTIFICATION VERIFICATION

(71) Applicant: NCR Voyix Corporation, Atlanta, GA (US)

(72) Inventors: Conor Michael Fyfe, Carnoustie (GB); Kacie Jacqueline Rattray, Tayport (GB)

(73) Assignee: NCR Voyix Corporation, Atlanta, GA (US)

( * ) Notice: Subject to any disclaimer, the term of this patent is extended or adjusted under 35 U.S.C. 154(b) by 68 days.

(21) Appl. No.: 17/752,006

(22) Filed: May 24, 2022

(65) Prior Publication Data

US 2023/0385831 A1     Nov. 30, 2023

(51) Int. Cl.
*G06Q 20/40* (2012.01)
*G06Q 20/20* (2012.01)
*G06V 40/16* (2022.01)

(52) U.S. Cl.
CPC ..... *G06Q 20/40145* (2013.01); *G06Q 20/202* (2013.01); *G06Q 20/206* (2013.01); *G06V 40/161* (2022.01); *G06V 40/168* (2022.01); *G06V 40/172* (2022.01)

(58) Field of Classification Search
USPC .......................................................... 705/75
See application file for complete search history.

(56) References Cited

U.S. PATENT DOCUMENTS

| | | | | |
|---|---|---|---|---|
| 10,354,126 B1 * | 7/2019 | Nagalla | ............ | G06Q 20/40145 |
| 11,449,869 B2 * | 9/2022 | Guo | ................ | G06Q 20/40145 |
| 11,488,220 B1 * | 11/2022 | Gutierrez | ........... | G06Q 30/0613 |
| 2003/0018897 A1 * | 1/2003 | Bellis, Jr. | ......... | G06Q 20/40145 |
| | | | | 713/182 |
| 2007/0086626 A1 * | 4/2007 | Mariani | ............... | G06V 40/161 |
| | | | | 382/115 |

(Continued)

OTHER PUBLICATIONS

A. M. Zinjurde and V. B. Kamble, "Credit Card Fraud Detection and Prevention By Face Recognition," 2020 International Conference on Smart Innovations in Design, Environment, Management, Planning and Computing (ICSIDEMPC), Aurangabad, India, 2020, pp. 86-90, doi: 10.1109/ICSIDEMPC49020.2020.9299587 (Year: 2020).*

(Continued)

*Primary Examiner* — Eduardo Castilho
(74) *Attorney, Agent, or Firm* — Schwegman Lundberg & Woessner, P.A.

(57)     ABSTRACT

A transaction terminal captures at least one image of a customer during a checkout and the customer is asked to place a photo identification card in view of the camera where a second image is captured of the card. The second image is converted to text and various components of the card are validated. Any hologram on the card is verified from the second image. The photo on the card is compared to facial features in the customer image and a determination is made as to whether the customer's identification can or cannot be verified. When verified, a message is sent to an attendant's device with the determination that the customer and card were verified along with the customer image and card image. The attendant is asked to confirm the verification and when confirmed the terminal resumes processing the checkout on behalf of the customer.

9 Claims, 3 Drawing Sheets

(56)      References Cited

U.S. PATENT DOCUMENTS

| | | | | |
|---|---|---|---|---|
| 2007/0138260 | A1* | 6/2007 | Keys | G06Q 20/4014 235/380 |
| 2010/0084462 | A1* | 4/2010 | Scipioni | G06Q 20/40145 235/380 |
| 2015/0078671 | A1* | 3/2015 | van Deventer | G06V 30/412 382/217 |
| 2015/0199702 | A1* | 7/2015 | Singh | G06Q 20/20 705/16 |
| 2015/0341370 | A1* | 11/2015 | Khan | H04L 63/20 726/30 |
| 2016/0104041 | A1* | 4/2016 | Bowers | G06F 21/41 382/115 |
| 2016/0125404 | A1* | 5/2016 | Roof | G06Q 20/202 705/18 |
| 2017/0351909 | A1* | 12/2017 | Kaehler | G06F 18/22 |
| 2018/0060928 | A1* | 3/2018 | Sadler | G06Q 20/20 |
| 2019/0325675 | A1* | 10/2019 | White | G07C 9/20 |
| 2019/0362169 | A1* | 11/2019 | Lin | G06Q 30/0607 |
| 2020/0042773 | A1* | 2/2020 | Benkreira | G06F 21/32 |
| 2020/0098023 | A1* | 3/2020 | Agarwal | G06Q 20/40 |
| 2020/0401792 | A1* | 12/2020 | McClellan | G06Q 20/40145 |
| 2021/0064900 | A1* | 3/2021 | Vorobiev | G06F 21/32 |
| 2021/0117529 | A1* | 4/2021 | Zamora Martínez | G06F 21/30 |
| 2022/0005047 | A1* | 1/2022 | Maheshwari | G06Q 20/363 |
| 2022/0245690 | A1* | 8/2022 | Ryner | G06Q 20/3278 |
| 2023/0206372 | A1* | 6/2023 | Ordorica | G06F 21/32 705/325 |
| 2023/0316790 | A1* | 10/2023 | Bayer | G06V 10/751 382/118 |

OTHER PUBLICATIONS

S. Suwannakhun, N. Chumuang and M. Ketcham, "Identification and Retrieval System by Using Face Detection," 2018 18th International Symposium on Communications and Information Technologies (ISCIT), Bangkok, Thailand, 2018, pp. 294-298, doi: 10.1109/ISCIT.2018.8587856. (Year: 2018).*

Crop Definition, TechTerms.com, retrieved from https://web.archive. org/web/20200813032128/https://techterms.com/definition/crop on Aug. 13, 2020, 2020, (Year: 2020).*

B. Gulnara and A. Yerassyl, "Using Image Processing and Optical Character Recognition to Recognise ID cards in the Online Process of Onboarding," 2022 SIST, Nur-Sultan, Kazakhstan, 2022, pp. 1-6, doi: 10.1109/SIST54437.2022.9945823. (Year: 2022).*

J. P and S. A, "A Comprehensive Analysis on Face Recognition using various Deep Learning Techniques," 2022 International Conference on Communication, Computing and Internet of Things (IC3IoT), Chennai, India, 2022, pp. 1-6, doi: 10.1109/IC3IOT53935. 2022.9767974. (Year: 2022).*

Y. Feng, S. Yu, H. Peng, Y. - R. Li and J. Zhang, "Detect Faces Efficiently: A Survey and Evaluations," in IEEE Transactions on Biometrics, Behavior, and Identity Science, vol. 4, No. 1, pp. 1-18, Jan. 2022, doi: 10.1109/TBIOM.2021.3120412. (Year: 2022).*

A. Bhat, R. K. Jha and V. Kedia, "Robust Face Detection and Recognition using Image Processing and OpenCV," 2022 6th International Conference on Computing Methodologies and Communication (ICCMC), Erode, India, 2022, pp. 1273-1278, doi: 10.1109/ ICCMC53470.2022.9753792. (Year: 2022).*

M. T. Islam, T. Ahmed, A. B. M. Raihanur Rashid, T. Islam, M. S. Rahman and M. Tarek Habib, "Convolutional Neural Network Based Partial Face Detection," 2022 IEEE 7th International conference for Convergence in Technology (I2CT), Mumbai, India, 2022, pp. 1-6, doi: 10.1109/I2CT54291.2022.9825259. (Year: 2022).*

H. Wang, J. Hu and W. Deng, "Face Feature Extraction: A Complete Review," in IEEE Access, vol. 6, pp. 6001-6039, 2018, doi: 10.1109/ Access.2017.2784842. (Year: 2018).*

Folego et al., "Cross-Domain Face Verification: Matching ID Document and Self-Portrait Photographs," CoRR, vol. abs/1611.05755, 2016, http://arxiv.org/abs/1611.05755. (Year: 2016).*

Shi, Yichun, and Anil K. Jain., "DocFace+: ID Document to Selfie Matching," CoRR, vol. abs/1809.05620, 2018, http://arxiv.org/abs/ 1809.05620. (Year: 2018).*

B. Gulnara and A. Yerassyl, "Using Image Processing and Optical Character Recognition to Recognise ID cards in the Online Process of Onboarding," 2022 Intl. Conference on Smart Information Systems and Technologies (SIST), Nur-Sultan, Kazakhstan, 2022, pp. 1-6, doi: 10.1109/SIST54437.2022.9945823 (Year: 2022).*

N. Khandan, "An Intelligent Hybrid Model for Identity Document Classification," in arXiv [Cs.CV], 2021, http://arxiv.org/abs/2106. 04345 (Year: 2021).*

Omatu et al., "Face Recognition State-of-the-art, Enablers, Challenges and Solutions: A Review," International Journal of Advanced Trends in Computer Science and Engineering, 2020, 9. 96-105. 10.30534/ijatcse/2020/1691.22020. (Year: 2020).*

Hajjouz et al., "Facial Match a step towards winning the battle against the fraudsters," Bachelor Thesis, Computer Science and Engineering, 2022, Halmstad Feb. 28, 2022, Retrieved from: https:// www.diva-portal.org/smash/get/diva2:1670925/FULLTEXT03 (Year: 2022).*

* cited by examiner

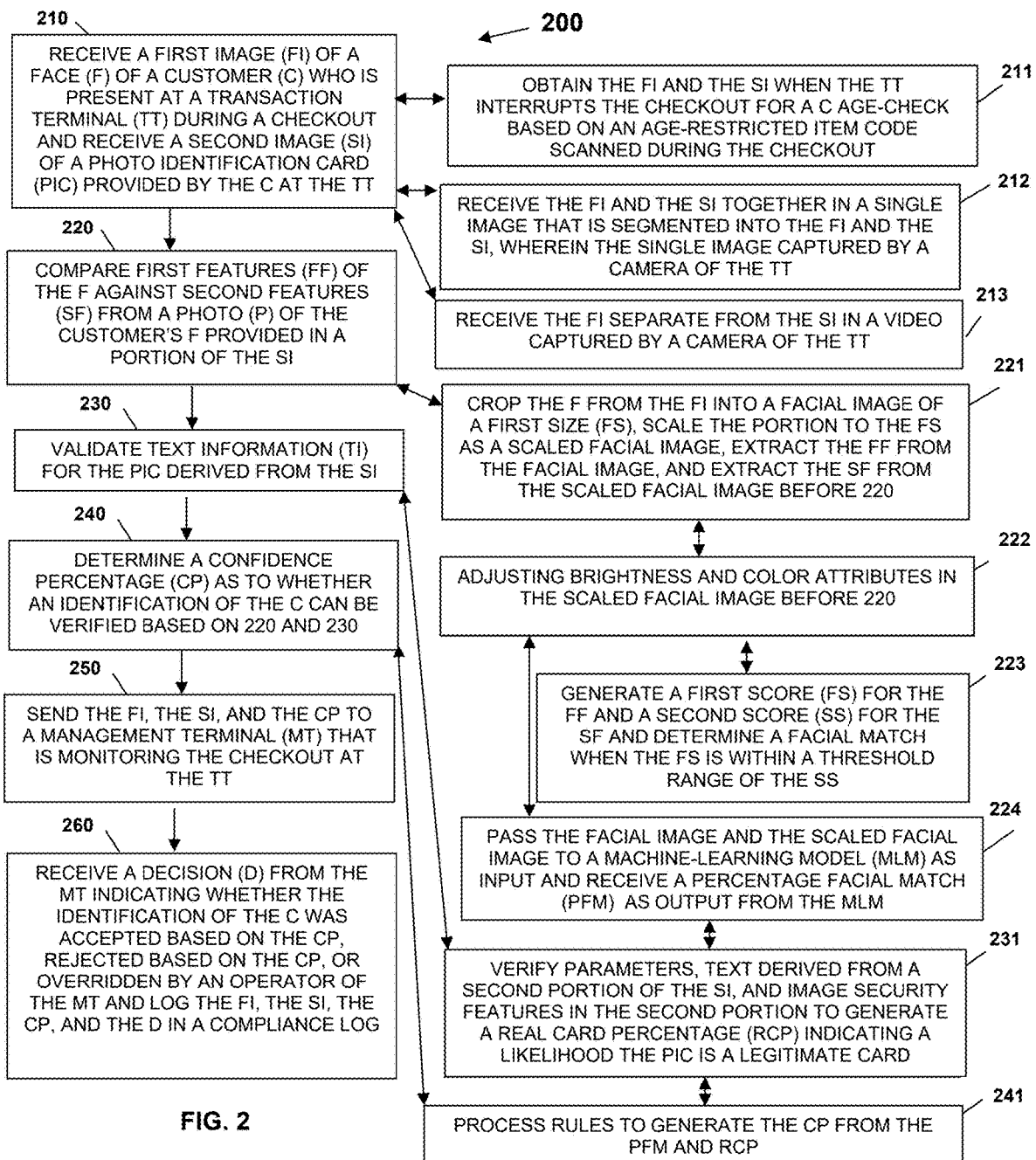

210
RECEIVE A FIRST IMAGE (FI) OF A FACE (F) OF A CUSTOMER (C) WHO IS PRESENT AT A TRANSACTION TERMINAL (TT) DURING A CHECKOUT AND RECEIVE A SECOND IMAGE (SI) OF A PHOTO IDENTIFICATION CARD (PIC) PROVIDED BY THE C AT THE TT

200

211
OBTAIN THE FI AND THE SI WHEN THE TT INTERRUPTS THE CHECKOUT FOR A C AGE-CHECK BASED ON AN AGE-RESTRICTED ITEM CODE SCANNED DURING THE CHECKOUT

220
COMPARE FIRST FEATURES (FF) OF THE F AGAINST SECOND FEATURES (SF) FROM A PHOTO (P) OF THE CUSTOMER'S F PROVIDED IN A PORTION OF THE SI

212
RECEIVE THE FI AND THE SI TOGETHER IN A SINGLE IMAGE THAT IS SEGMENTED INTO THE FI AND THE SI, WHEREIN THE SINGLE IMAGE CAPTURED BY A CAMERA OF THE TT

213
RECEIVE THE FI SEPARATE FROM THE SI IN A VIDEO CAPTURED BY A CAMERA OF THE TT

230
VALIDATE TEXT INFORMATION (TI) FOR THE PIC DERIVED FROM THE SI

221
CROP THE F FROM THE FI INTO A FACIAL IMAGE OF A FIRST SIZE (FS), SCALE THE PORTION TO THE FS AS A SCALED FACIAL IMAGE, EXTRACT THE FF FROM THE FACIAL IMAGE, AND EXTRACT THE SF FROM THE SCALED FACIAL IMAGE BEFORE 220

240
DETERMINE A CONFIDENCE PERCENTAGE (CP) AS TO WHETHER AN IDENTIFICATION OF THE C CAN BE VERIFIED BASED ON 220 AND 230

222
ADJUSTING BRIGHTNESS AND COLOR ATTRIBUTES IN THE SCALED FACIAL IMAGE BEFORE 220

250
SEND THE FI, THE SI, AND THE CP TO A MANAGEMENT TERMINAL (MT) THAT IS MONITORING THE CHECKOUT AT THE TT

223
GENERATE A FIRST SCORE (FS) FOR THE FF AND A SECOND SCORE (SS) FOR THE SF AND DETERMINE A FACIAL MATCH WHEN THE FS IS WITHIN A THRESHOLD RANGE OF THE SS

224
PASS THE FACIAL IMAGE AND THE SCALED FACIAL IMAGE TO A MACHINE-LEARNING MODEL (MLM) AS INPUT AND RECEIVE A PERCENTAGE FACIAL MATCH (PFM) AS OUTPUT FROM THE MLM

260
RECEIVE A DECISION (D) FROM THE MT INDICATING WHETHER THE IDENTIFICATION OF THE C WAS ACCEPTED BASED ON THE CP, REJECTED BASED ON THE CP, OR OVERRIDDEN BY AN OPERATOR OF THE MT AND LOG THE FI, THE SI, THE CP, AND THE D IN A COMPLIANCE LOG

231
VERIFY PARAMETERS, TEXT DERIVED FROM A SECOND PORTION OF THE SI, AND IMAGE SECURITY FEATURES IN THE SECOND PORTION TO GENERATE A REAL CARD PERCENTAGE (RCP) INDICATING A LIKELIHOOD THE PIC IS A LEGITIMATE CARD

241
PROCESS RULES TO GENERATE THE CP FROM THE PFM AND RCP

FIG. 2

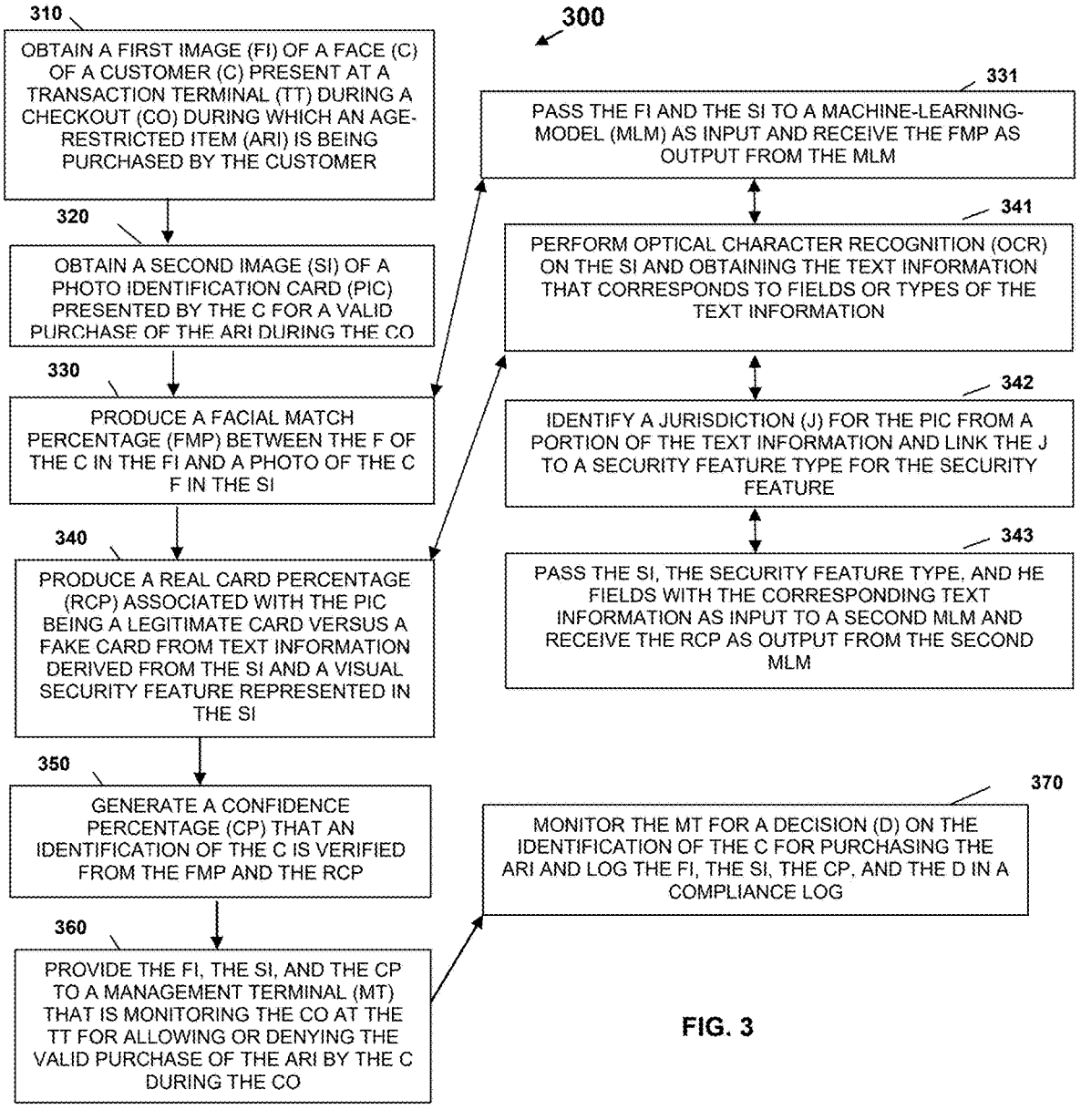

310
OBTAIN A FIRST IMAGE (FI) OF A FACE (C) OF A CUSTOMER (C) PRESENT AT A TRANSACTION TERMINAL (TT) DURING A CHECKOUT (CO) DURING WHICH AN AGE-RESTRICTED ITEM (ARI) IS BEING PURCHASED BY THE CUSTOMER

300

331
PASS THE FI AND THE SI TO A MACHINE-LEARNING-MODEL (MLM) AS INPUT AND RECEIVE THE FMP AS OUTPUT FROM THE MLM

320
OBTAIN A SECOND IMAGE (SI) OF A PHOTO IDENTIFICATION CARD (PIC) PRESENTED BY THE C FOR A VALID PURCHASE OF THE ARI DURING THE CO

341
PERFORM OPTICAL CHARACTER RECOGNITION (OCR) ON THE SI AND OBTAINING THE TEXT INFORMATION THAT CORRESPONDS TO FIELDS OR TYPES OF THE TEXT INFORMATION

330
PRODUCE A FACIAL MATCH PERCENTAGE (FMP) BETWEEN THE F OF THE C IN THE FI AND A PHOTO OF THE C F IN THE SI

342
IDENTIFY A JURISDICTION (J) FOR THE PIC FROM A PORTION OF THE TEXT INFORMATION AND LINK THE J TO A SECURITY FEATURE TYPE FOR THE SECURITY FEATURE

340
PRODUCE A REAL CARD PERCENTAGE (RCP) ASSOCIATED WITH THE PIC BEING A LEGITIMATE CARD VERSUS A FAKE CARD FROM TEXT INFORMATION DERIVED FROM THE SI AND A VISUAL SECURITY FEATURE REPRESENTED IN THE SI

343
PASS THE SI, THE SECURITY FEATURE TYPE, AND HE FIELDS WITH THE CORRESPONDING TEXT INFORMATION AS INPUT TO A SECOND MLM AND RECEIVE THE RCP AS OUTPUT FROM THE SECOND MLM

350
GENERATE A CONFIDENCE PERCENTAGE (CP) THAT AN IDENTIFICATION OF THE C IS VERIFIED FROM THE FMP AND THE RCP

370
MONITOR THE MT FOR A DECISION (D) ON THE IDENTIFICATION OF THE C FOR PURCHASING THE ARI AND LOG THE FI, THE SI, THE CP, AND THE D IN A COMPLIANCE LOG

360
PROVIDE THE FI, THE SI, AND THE CP TO A MANAGEMENT TERMINAL (MT) THAT IS MONITORING THE CO AT THE TT FOR ALLOWING OR DENYING THE VALID PURCHASE OF THE ARI BY THE C DURING THE CO

FIG. 3

CUSTOMER IDENTIFICATION VERIFICATION

BACKGROUND

Although self-checkouts have been embraced by customers during the COVID-19 pandemic, many customers were surprised to learn that face-to-face contact with employees of a store were necessary when the customers were purchasing restricted items that required age verification, such as alcohol and tobacco. Often the employee just asked the customer to place the identification card down and move away so that the employee could compare the picture on the card with what the employee visually sees from the customer. However, this still made a lot of customers uncomfortable fearing pathogen exposure during the face-to-face contact.

Customer identification verification is not something stores can voluntarily dispense with; government regulations require that someone buying a restricted item be age verified before the item can be purchased. Stores covet their liquor licenses and are at risk of losing the licenses when alcohol is sold to underaged minors even when the minors present fake identification cards. As a result, stores often do not trust the judgment of their employees and often require the employees to card everyone regardless of age and then confirm that they checked the card by entering the birthdates of the purchasers. The problem here is that every fake card has a fake birthdate (that is the point of fake identification cards), such that these procedures do little to shield the stores when fake cards are used by customers and discovered by government agents.

Furthermore, each time during a self-checkout a customer purchases a restricted item, an attendant has to be dispatched to physically go to the checkout terminal and perform the card verification. Customers frequently purchase alcohol, which means attendants are continuously being dispatched to the terminals. During high customer traffic, this can result in long customer queues forming and customer frustration. Generally, only one attendant staffs a bank of several self-checkout lanes; the sole attendant can become overwhelmed checking cards during specific times of the year, particularly approaching holidays or long weekend celebrations.

Cards must be checked for age restricted items even during cashier-assisted checkouts. This too can be problematic during periods of high customer traffic, especially when customers who feel they are plenty old enough to not require verification become agitated with the cashier or struggle to locate their identification card when asked to present it.

SUMMARY

In various embodiments, methods and a system for customer identification verification are presented.

According to an aspect, a method for system for customer identification verification processing is presented. A first image of a face of a customer who is present at a transaction terminal during a checkout is received and a second image of a photo identification card provided by the customer at the transaction terminal is received. First features of the face are compared against second features from a photo of the customer's face provided in a portion of the second image. Text information for the photo identification card derived from the second image is validated. A determination is made as to whether an identification of the customer can be verified based on the face comparison and the card validation.

BRIEF DESCRIPTION OF THE DRAWINGS

FIG. 2 is a diagram of a method for system for customer identification verification correlation processing, according to an example embodiment.

FIG. 3 is a diagram of another method for system for customer identification verification, according to an example embodiment

DETAILED DESCRIPTION

Figure 1:
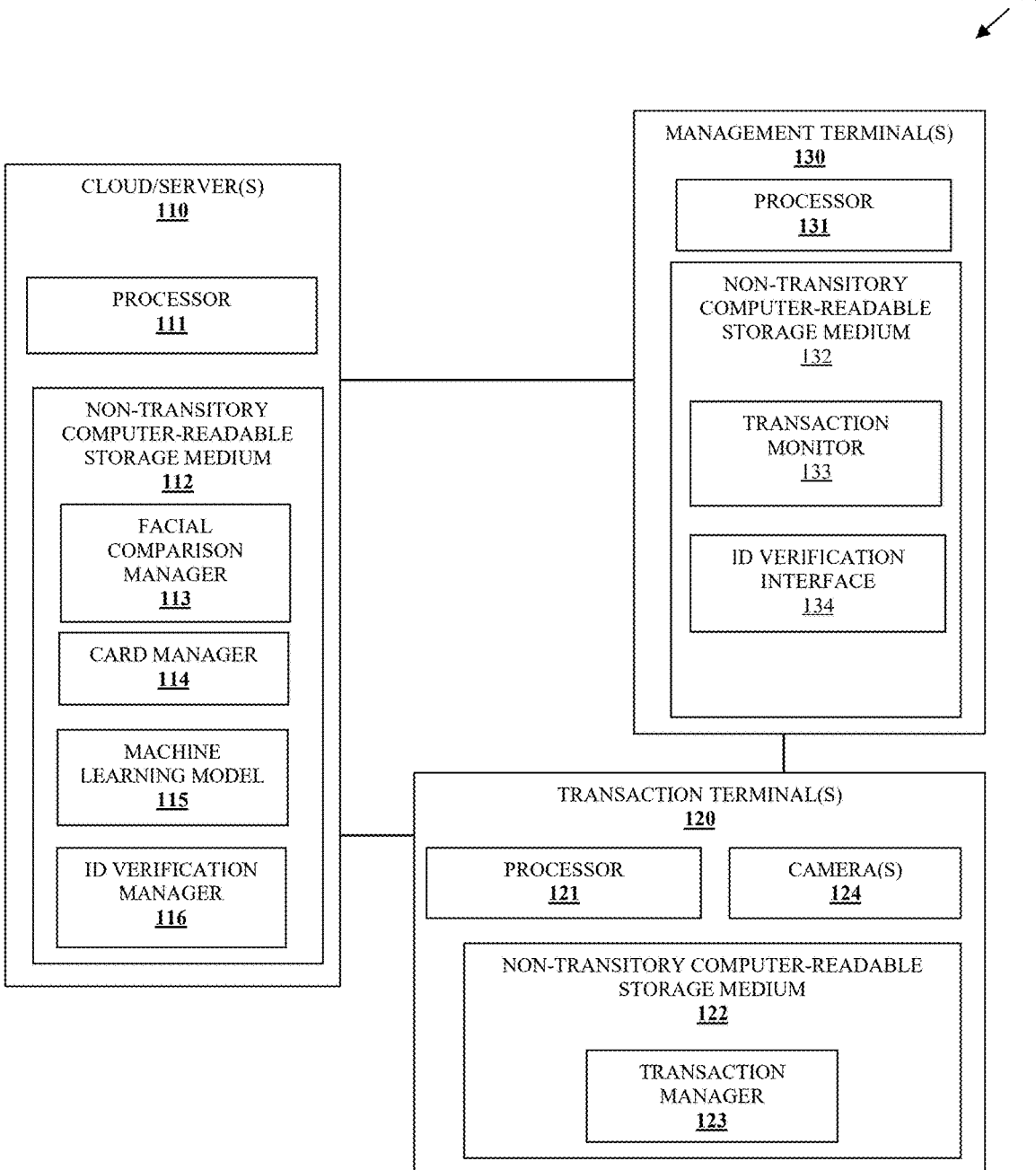
FIG. 1 is a diagram of a system for system for customer identification verification processing, according to an example embodiment.

FIG. 1 is a diagram of a system 100 for system for customer identification verification according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of system for customer identification verification, presented herein and below.

As will be demonstrated herein, system 100 provides techniques by which a customer present at a transaction terminal during a check is verified against a photo identification card provided by the customer. Information on the card is also verified. When the card information is verified and an image of the customer's face is verified against the photo of the customer on the card, a message is sent to a remote attendant that indicates the customer's identification was verified along with the customer card. The attendant is then presented with a photo of the card and a photo of the customer present at the terminal and asked to approve the verification. When the verification is approved, the terminal resumes the checkout on behalf of the customer. The attendant does not have to physically travel to the terminal for customer identification verification. Customer identification verification is performed remotely. Details of a decision that a customer was verified are saved with the transaction record for the checkout as an audit trail providing evidence to governmental authorities that the proper check was performed on the customer for the checkout.

Fake identification cards are a common issue in the industry and are becoming harder to identify. Artificial Intelligence (AI) and Machine-Learning Models (MLMs) are deployed to recognize valid identification of the customer vis-a-vis the identification card and determine whether the identification card is real or fake. Facial recognition helps identify customers attempting to use another person's identification card to buy age-restricted items. The MLM outputs a predicted percentage match between a customer and identification, which assists an attendant in making a decision as to whether to approve the customer's identification or not. Parameters on the identification card is also checked for spelling mistakes, date-of-birth, any holographic symbols, and other oddities present.

Existing cameras integrated into the terminals are used to both capture the faces of customers and their photo identification cards for customer identification verification. A computer vision algorithm is processed to calculate a percentage based on the likeliness that the customer matches their identification card. An AI algorithm analyzes the parameters of the identification card to check for spelling mistakes, data of birth, holographic symbols, and other oddities. The algorithm will be able to check every detail of the identification and reduce illegal sales caused by human mistakes during checkouts. MLMs may also be used such as Convolutional Neural Networks to check identification (including the image of the customer's face, the photo of the customer on the card, and details/parameters of the card). The image of the customer's face, the photo identification card, and the output algorithmic percentage prediction along with any concerns about the identification card highlighted is sent to a remote management terminal (manned by an attendant for a bank of SSTs). The attendant can then verify the identification with confidence as the process has check all aspects of identification and actions of the process logged for compliance and auditing by government authorities as needed.

It is within this context that various embodiments are now discussed beginning with system 100 and FIG. 1.

System 100 comprises at least one cloud/server 110, one or more transaction terminals 120, and one or more management terminals 130.

Cloud/server 110 comprises a processor and a non-transitory computer-readable storage medium 112. Medium 112 comprises executable instructions for a facial comparison manager 113, a card manager 114, a MLM 115, and an identification (ID) verification manager 116. When the executable instructions are executed by processor 111, this causes processor 111 to perform operations discussed herein and below with respect to 113-116.

Each transaction terminal 120 (herein after just "terminal 120") comprises at least one processor 121, a non-transitory computer-readable storage medium 122, and at least one customer-facing camera 124. Medium 122 comprises executable instructions for a transaction manager 123. When the executable instructions are executed by processor 121 from medium 122, this causes processor 121 to perform operations discussed herein and below with respect to 123.

Each management terminal 130 comprises a processor 131 and a non-transitory computer-readable storage medium 132. Medium 132 comprises executable instructions for a transaction monitor 133 and an ID verification interface. When the executable instructions are executed by processor 131 from medium 132, this causes processor 131 to perform operations discussed herein and below with respect to 133-134.

Initially, camera 124 is oriented and focused to capture video of a face of a customer at terminal 120. The images of the video are streamed in real time to a network-accessible location accessible to emotion manager 113.

During a transaction flow of a checkout (transaction), transaction manager 123 raises an interrupt indicating that an intervention is required in the checkout to verify a photo identification card of a customer that is purchasing an age-restricted item (such as alcohol and/or tobacco). The item code for the item is identified in the workflow as requiring card and customer verification. The workflow and a portion of the user-facing transaction interface is modified to present transaction interface screens to the user that requests that the user stand still in front of the camera 124 or stand in a certain location and requests that the customer hold up their photo identification card next to their face or directly in front of the camera 124. It is noted that the video may be continuous capturing images of the customers face in image frames of the video, such that in some cases the customer is simply asked to hold up their photo identification card. The customer may also be asked to turn the card over, such that image frames in the video can capture both the front and back of the government-issued identification card (such as a driver's license, a passport, etc.).

The workflow associated with the transaction intervention for customer and card verification may then be modified to alert an attendant who is operating a management terminal 130 that cloud/server 110 is performing customer and card verification.

Image frames of the video for a customer face and the photo identification card during a checkout are obtained by facial comparison manager 113. The image frames are time stamped and associated with a specific terminal identifier for the terminal 120 and a specific management terminal 130. The image frames for the face of the customer on the card may be enhanced using imaging enhancement techniques to improve the image quality of the image of the customer's photo on the card, for example brightness, scaling, color, etc. are capable of being enhanced within the image of the customer's photo. Facial comparison manager 113 then uses vision processing algorithms to compare the face of the customer captured in image frames of the customer's face against the image of the photo of the customer's face on the card.

For instance, and in an embodiment, the size of the image for the customer's photo may be scaled to the size of the image frames of the customer's face captured live during the checkout. A distance between the customer's eyes are then compared, a length of a nose of the customer is then compared, a distance between a base of the customer's nose and lips, a color of the customer eyes compared (assuming the photo of the customer on the card is in color), and other comparisons can be made. Each comparison may result in a score, which is added to obtain a final score. When the final score is within a predefined threshold score, facial comparison manager 113 may determine that the customer at the terminal is in fact the person presented in the photo on the card. When the final score is below the predefined threshold, facial comparison manager 113 may determine that the customer is unlikely to be the person presented in the photo on the card.

In an embodiment, facial comparison manager 113 may also pass one or more image frames for a live version of the customer's face and an enhanced image or non-enhanced image of the photo on the card as input to a trained MLM, which returns as output a score or a percentage. Facial comparison manager 113 compares the score against the predefined threshold score as discussed above to determine whether the customer is the person presented in the photo on the card.

In an embodiment, facial comparison manager 113 may use an existing facial recognition algorithm and pass a live version of the customer's face and an enhanced or non-enhanced image of the photo on the card as input to the existing facial recognition algorithm, which returns a score as output or a binary output match or no match. Facial comparison manager 113 uses the output to determine whether the customer is the person presented in the photo on the card.

Concurrent to the facial comparison manager 113 making a determination as to whether the customer is the person in the photo on the identification card, card manager 114 works on determining whether the parameters and information associated with the parameters on the card are legitimate or not. That is both facial comparison manager 113 and card manager 114 can be processed in parallel to one another.

Card manager 114 performs Optical Character Recognition (OCR) on the parameters and corresponding information. The parameters may include a name, a date of birth, a card issue date, a card expiration date, issuing authority, type of card (driver's license, passport, etc.), address, sex, eye color, etc. Card manager 114 also identifies any holographic or other security features associated with the type of card and the issuing authority (this can be determined via a lookup table for the issuing authority and the type of card).

Card manager 114 verifies whether the security features that are supposed to be there are present or not and evaluated the text information from the parameters. For example, suppose the expiration date is Apr. 1, 2022, on the card but the present date is Apr. 2, 2022, card manager 114 can invalidate the card based on this alone. Card manager 114 may also calculate what the birth date needs to be to be the proper age to purchase the item based on the jurisdiction of the terminal (18 or 21 in most instances). If the birth date indicates the customer is under age required by the jurisdiction to purchase the item, card manager 114 can invalidate the card. Card manager 114 may also check for spelling errors in the parameters and the information associated with the parameters, any spelling errors can be used to invalidate the card as a potential fake card.

Card manager 114 may generate a score from 0-100 as to the authenticity of the card and provide the score as output.

In an embodiment, the card image with the photo of the customer and the live captured image of the customer are provided as input to MLM 115. MLM 115 outs a confidence percentage (0-1) as to whether the customer is the person presented in the photo on the card and as to whether the card is legitimate and not fake.

In an embodiment, card manager 114 performs the OCR, locates the jurisdiction and obtains the card security features and the age requirement and passes the parameters, information associated with the parameters, the card security features, and the age requirement to MLM 115 as input along with an image of the card. MLM 115 outputs a confidence percentage that the card is real or fake. In this embodiment, the MLM 115 is not used for the facial comparison between the live image of the customer and the image of the photo of the customer on the card, which is separately and concurrently performed by facial comparison manager 113 (and facial comparison manager 113 may use a different MLM to perform this check, as was discussed above).

Once facial comparison manager 113 and card manager 114 return their results (score for whether the customer is the person in the photo on the card and confidence percentage that the card is real), ID verification manager 116 may process rules to combine the score and percentage into a single aggregated score or percentage as to whether the customer can or cannot be verified for the purchase of the age-restricted item during the checkout. Alternatively, the score and percentage are maintained as produced by facial comparison manager 113 and card manager 114 (which could have been through MLM 115).

ID verification manager 116 sends a live image of the customer and image of the card and the percentage (can be score and percentage) to management terminal 130 through ID verification interface 134. An attendant is then presented with a screen to authorize or not authorize the age-restricted item purchase. When authorized, transaction monitor 133 clears the interrupt initiated by transaction manager 123 and the checkout (transaction) proceeds for the customer at the terminal 120. Notice that there was no attendant to customer interaction (decreasing the potential for pathogen exposure) and that the attendant did not have to leave the location of the attendant to verify the customer's identification and card. Moreover, since facial comparison between the live image of the customer's face and the image of the customer's phone on the card is processed in parallel with card verification, the delay experienced by the customer is minimal (maybe a few seconds and only this long because the attendant has to approve via the ID verification interface 134).

Additionally, the image of the card, the customer's live captured image, the checkout identifier for the checkout, the terminal identifier for the terminal 120, the current calendar date, the current time of day, the score and/or percentage, and attendant authorization are all retained in a compliance log as evidence that the store associated with system 100 followed all government required regulations when the age-restricted item was authorized for the customer. This should give stores assurance that each age-restricted item is being properly vetted and assurance that it is unlikely any government entity is going to be able to revoke the store's liqueur and/or tobacco license.

In an embodiment, the attendant is free to elect to override an unauthorized decision by physically visiting the terminal 120 and performing a conventional customer verification. However, when this occurs the decision to override by the attendant is recorded in the compliance log for investigation by the store to ensure through other cameras and video that the attendant did in fact perform the check.

In an embodiment, the management terminal 130 is a mobile device of an attendant, such as a tablet, a phone, a laptop, a wearable processing device.

In an embodiment, the management terminal 130 is a transaction terminal configured to run transaction monitor 133 and is situated near transaction terminals 120 that are Self-Service Terminals (SSTs).

In an embodiment, the transaction terminals can be SSTs and/or Point-Of-Sale (POS) terminals.

In the case of a terminal 120 being a POS terminal, a cashier assists the customer during the checkout. Here, the cashier is not required to handle the identification card of the customer, rather the customer is instructed to hold the card up next to the customer's face and a customer-facing camera 124 captures the live image of the customer and an image of the card. The cashier then sees what was described above for the attendant of management terminal 130 through an ID verification interface 134 processing on the POS terminal. The cashier then authorizes or overrides to do a manual check of the card based on results provided by ID verification manager 116.

In an embodiment, the components 113-116 are subsumed and processed on a retailer server associated with a retailer of a store that has the terminals 120 and the management terminal 130.

In an embodiment, the components 113-116 are provided as Software-as-a-Service (SaaS) to transaction monitor 133, such that ID verification manager 116 interacts with monitor 133 via an Application Programming Interface and ID verification interface 134 is not needed with system 100.

The above-noted embodiments and other embodiments are now discussed with reference to FIGS. 2-3.

FIG. 2 is a diagram of a method 200 for system for customer identification verification, according to an example embodiment. The software module(s) that implements the method 200 is referred to as a "real-time customer identification verifier." The real-time customer identification verifier is implemented as executable instructions programmed and residing within memory and/or a non-transitory computer-readable (processor-readable) storage medium and executed by one or more processors of a device or set of devices. The processor(s) of the device(s) that executes the real-time customer identification verifier are specifically configured and programmed to process the real-time customer identification verifier. The real-time customer identification verifier may have access to one or more network connections during its processing. The network connections can be wired, wireless, or a combination of wired and wireless.

In an embodiment, the real-time customer identification verifier executes on server 110. In an embodiment, the server 110 is one of several servers logically presenting and cooperating as a single server representing a cloud 110 or a cloud processing environment 110.

In an embodiment, the real-time customer identification verifier executes on a retailer server.

In an embodiment, the real-time customer identification verifier is one, all, or some combination of 113-116.

In an embodiment, the real-time customer identification verifier is processed as or provided as a SaaS to transaction monitor 133 of management terminal 130 using an API.

At 210, real-time customer identification verifier receives a first image of a face of a customer who is present at a transaction terminal 120 during a checkout and the real-time customer identification verifier receives a second image of a photo identification card provided by the customer at the transaction terminal 120.

In an embodiment, at 211, the real-time customer identification verifier obtains the first image and the second image when the transaction terminal 120 interrupts the checkout for a customer age-check based on an age-restricted item code scanned during the checkout.

In an embodiment, at 212, the real-time customer identification verifier receives the first image and the second image together as a single image that is segmented into the first image and the second image. The single image captured by a camera 124 of the transaction terminal 120.

In an embodiment, at 213, the real-time customer identification verifier receives the first image separate from the second image in a video captured by a camera of the transaction terminal 120.

At 220, the real-time customer identification verifier compares first features of the face from the first image against second features from a photo of the customer's face provided in a portion of the second image for the photo identification card.

In an embodiment, at 221, the real-time customer identification verifier crops the face from the first image into a facial image of a first size. The real-time customer identification verifier scales the portion of the second image representing the photo to the first size (same size or substantially the same size as the facial image) producing a scaled facial image. The real-time customer identification verifier extracts the first features from the facial image and extracts the second features from the scaled facial image before the performance of the comparison at 220.

In an embodiment of 221 and at 222, the real-time customer identification verifier adjust brightness and color attributes in the scaled image before performing the comparison at 220.

In an embodiment of 222 and at 223, the real-time customer identification verifier generates a first score for the first features and a second score for the second features and determines a facial match for the customer is present when the first score is within a threshold range of the second score.

In an embodiment of 222 and at 224, the real-time customer identification verifier passes the facial image and the scaled facial image to a MLM as input and receives a percentage facial match as output from the MLM.

At 230, the real-time customer identification verifier validates text information for the photo identification card derived from the second image.

In an embodiment of 224 and 230, at 231, the real-time customer identification verifier verifies parameters (fields), text derived from a second portion (non-photo portion) of the second image, and image security features (watermarks, hologram, etc.) in the second portion to generate a real card percentage indicating a likelihood that photo identification card is a legitimate card.

At 240, the real-time customer identification verifier determines a confidence percentage as to whether an identification of the customer can be verified based on 220 and 230.

In an embodiment of 231 and 240, at 241, the real-time customer identification verifier processes rules to generate the confidence percentage from the percentage facial match at 224 and the real card percentage at 231.

In an embodiment, at 250, the real-time customer identification verifier sends the first image, the second image, and the confidence percentage to a management terminal 130 that is monitoring the checkout at the transaction terminal.

In an embodiment of 250 and at 260, the real-time customer identification verifier receives a decision from the management terminal 130 indicating whether the identification of the customer was accepted based on the confidence percentage, rejected based on the confidence percentage, or overridden by an operator of the management terminal 130. The real-time customer identification verifier logs the first image, the second image, the confidence percentage, and the decision in a compliance log.

FIG. 3 is a diagram of a method 300 for system for customer identification verification, according to an example embodiment. The software module(s) that implements the method 300 is referred to as an "age-restricted item customer verifier." The age-restricted item customer verifier is implemented as executable instructions programmed and residing within memory and/or a non-transitory computer-readable (processor-readable) storage medium and executed by one or more processors of a device or set of devices. The processor(s) of the device that executes the age-restricted item customer verifier are specifically configured and programmed to process the age-restricted item customer verifier. The age-restricted item customer verifier may have access to one or more network connections during its processing. The network connections can be wired, wireless, or a combination of wired and wireless.

In an embodiment, the device that executes the age-restricted item customer verifier is a server 110.

In an embodiment, the device that executes the age-restricted item customer verifier is a plurality of servers cooperating as a single cloud 110.

In an embodiment, the age-restricted item customer verifier is a retailer server.

In an embodiment, the age-restricted item customer verifier processes or is provided as a SaaS to a transaction monitor 133 of a management terminal 130.

In an embodiment, the age-restricted item customer verifier is all of, or some combination of, 113, 114, 115, 116, and/or method 200.

The age-restricted item customer verifier presents another, and in some ways, enhanced processing prospective to that which was discussed above with method 200 of FIG. 2.

At 310, age-restricted item customer verifier obtains a first image of a face of a customer present at a transaction terminal 120 during a checkout during which an age-restricted item is being purchased by the customer.

At 320, the age-restricted item customer verifier obtains a second image of a photo identification card presented by the customer for a valid purchase of the age-restricted item during the checkout.

At 330, the age-restricted item customer verifier produces a facial match percentage between the face of the customer in the first image and a photo of the customer's face in the second image of the photo identification card.

In an embodiment, at 331, the age-restricted item customer verifier passes the first image and the second image to a MLM as input and receives the facial match percentage as output from the MLM.

At 340, the age-restricted item customer verifier produces a real-card percentage associated with the photo identification card being a legitimate card versus a fake card from text information derived from the second image and from a visual security feature presented in the second image.

In an embodiment of 331 and 340, at 341, the age-restricted item customer verifier performs OCR on the second image and obtains the text information that corresponds to fields (parameters) or types of information.

In an embodiment of 341 and at 342, the age-restricted item customer verifier identifies a jurisdiction for the photo identification card from a portion of the text information and links the jurisdiction to a security feature type for the visual security feature.

In an embodiment of 342 and at 343, the age-restricted item customer verifier passes the second image, the security feature type, and the fields with the corresponding text information as input to a second MLM 115 and receives the real-card percentage as output from the second MLM 115.

At 350, the age-restricted item customer verifier generates a confidence percentage that in identification of the customer is verified from the facial match percentage and the real-card percentage.

At 360, the age-restricted item customer verifier provides the first image, the second image, and the confidence percentage to a management terminal 130 that is monitoring the checkout at the transaction terminal 120 for allowing or denying the valid purchase of the age-restricted item by the customer during the checkout.

In an embodiment of 360 and at 370, the age-restricted item customer verifier monitors the management terminal 130 for a decision on the identification of the customer for purchasing the age-restricted item and the age-restricted item customer verifier logs the first image, the second image, the confidence percentage, and the decision in a compliance log.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving, by a transaction terminal equipped with at least one processor and a non-transitory computer-readable storage medium, a first image of a face of a customer who is present at the transaction terminal during a checkout and receiving a second image of a photo identification card provided by the customer at the transaction terminal;

wherein receiving includes:

receiving the first image and the second image together in a single image that is segmented into the first image and the second image, wherein the single image is captured by a camera of the transaction terminal;

comparing, using a machine-learning model executed by a processor of a server, first features of the face against second features from a photo of the customer's face provided in a portion of the second image;

wherein comparing includes:

passing the first image and the second image to the machine-learning model as input and receiving a percentage facial match as output from the machine-learning model;

validating, via optical character recognition software executed by the at least one processor, text information for the photo identification card derived from the second image, wherein validating includes checking security features specific to a type of the photo identification card; and determining, based on the comparing and the validating, a confidence percentage as to whether an identification of the customer can be verified based on the comparing and the validating, wherein the determining includes employing an algorithm tailored to enhance security in real time.

2. The method of claim 1, further comprising sending the first image, the second image, and the confidence percentage to a management terminal that is monitoring the checkout at the transaction terminal.

3. The method of claim 2, further comprising:

receiving a decision from the management terminal indicating whether the identification of the customer: was accepted based on the confidence percentage, was rejected based on the confidence percentage, or was overridden by an operator of the management terminal; and logging the first image, the second image, the confidence percentage, and the decision in a compliance log.

4. The method of claim 1, wherein receiving further includes obtaining the first image and the second image when the transaction terminal interrupts the checkout for a customer age-check because of an age-restricted item code scanned during the checkout.

5. The method of claim 1, further comprising cropping the face from the first image into a facial image of a first size, scaling the portion of the second image to the first size as a scaled facial image, extracting the first features from the facial image, and extracting the second features from the scaled facial image as part of the comparing.

6. The method of claim 5, wherein cropping further includes pre-processing the scaled facial image by adjusting brightness and color attributes in the scaled facial image before the comparing.

7. The method of claim 6, wherein pre-processing further includes passing the facial image and the scaled facial image to the machine-learning model and receiving the percentage facial match as output from the machine-learning model.

8. The method of claim 7, wherein validating further includes verifying parameters, text derived information from a second portion of the second image, and image security features in the second portion of the second image to generate a real card percentage indicating a likelihood the photo identification card is a legitimate card.

9. The method of claim 8, wherein determining further includes processing rules to generate the confidence percentage from the percentage facial match and the real card percentage.

* * * * *